United States Patent Office 2,900,391
Patented Aug. 18, 1959

2,900,391

SYNTHESIS OF GLUTAMIC ACID

Oscar L. Norman, Northbrook, Ill., assignor to International Minerals & Chemical Corporation, a corporation of New York No Drawing. Application September 25, 1957
Serial No. 686,018

9 Claims. (Cl. 260—326.3)

The present invention relates to the preparation of glutamic acid. More particularly, it relates to the synthesis of pyrrolidonecarboxylic acid and DL-glutamic acid from $\Delta^2$-cyclopentenylamine.

A method for the synthetic production of glutamic acid is described in Sullivan U.S. Patent 2,801,250 (July 30, 1957), proceeding through dicyclopentadiene, cyclopentadiene, 3-chlorocyclopentene, and "3-aminocyclopentene." In the Sullivan process, 3-aminocyclopentene (which may be more precisely named $\Delta^2$-cyclopentenylamine) is subjected to oxidation with any of several common oxidizing agents such as nitric acid, chromic acid, potassium permangante, and the like. In order to avoid loss of the amino group during such oxidation, Sullivan found it necessary to protect the amino group by reacting it with a carboxylic acid to form the amide thereof; and after oxidation, it was necessary to remove the protective group by hydrolysis under conventional conditions. The necessity for carrying out these additional operations, as well as the expenditure of process materials therein, constitute a severe economic burden on the overall process.

I have now developed an improved technique for effecting the conversion of $\Delta^2$-cyclopentenylamine (which for convenience will be referred to hereinafter as "cyclopentenylamine") to DL-pyrrolidonecarboxylic acid and DL-glutamic acid. Specifically, I have found that the desired conversion can be achieved by first converting cyclopentenylamine into a cyclopentenylammonium salt of a strong acid, subjecting the salt to ozonization in suspension or preferably in solution in a suitable solvent, cleaving the ozonization product under oxidizing conditions to produce a mixture of DL-glutamic acid and DL-pyrrolidonecarboxylic acid (which can be separately recovered if desired), subjecting the oxidation product to hydrolysis under conditions conventional for the conversion of pyrrolidonecarboxylic acid to glutamic acid, and recovering DL-glutamic acid from the hydrolysis product.

An object of the present invention is to prepare glutamic acid by synthetic means.

Another object is to convert cyclopentenylamine into pyrrolidonecarboxylic acid and glutamic acid.

Another object is to convert cyclopentenylamine into an ozonization product which can be converted into glutamic acid by oxidative cleavage and hydrolysis.

Another object is to improve the oxidative conversion of cyclopentenylamine into DL-glutamic acid.

Other objects of the invention will be apparent from the present descritpion and claims.

The preparation of cyclopentenylamine is conveniently carried out, for example, by commingling 3-chlorocyclopentene, methylene chloride, and liquid ammonia in about 1:1:4 weight ratio in a pressure vessel at Dry Ice temperature, sealing the vessel, and allowing to warm to room temperature. At the end of around 30 minutes at room temperature, unreacted ammonia is vented from the vessel, and solid-phase ammonium chloride is filtered from the product, leaving a solution of cyclopentenylamine in methylene chloride. Other solvents may, of course, be utilized in the preparation. The cyclopentenylamine can conveniently be isolated, if desired, by fractional distillation, by precipitation with anhydrous hydrogen chloride or other strong acid, or by other means well known in the art.

In accordance with my invention, a mixture of cyclopentenylamine with a suitable solvent is acidified with sulfuric acid, phosphoric acid, trichloroacetic acid, or other strong acid, preferably hydrogen chloride, to convert the amine into the corresponding cyclopentenylammonium salt, after which an ozone-containing gas is passed through the mixture until the cyclopentenylammonium salt has been substantially completely ozonized. Any solvent can be used which dissolves the cyclopentenylammonium salt at least to some extent (suitably around 2% by weight or more), which does not undergo reaction during the ozone treatment, and which does not adversely affect the course of the ozonization reaction. I prefer to use a lower aliphatic fatty acid, such as formic acid, acetic acid, propionic acid, or the like; or a lower aliphatic alcohol, such as methanol, ethanol, isopropyl alcohol, n-butyl alcohol, or the like. The proportion of cyclopentenylammonium salt to solvent may vary widely, and can conveniently range from about 5% to about 25% by weight, based on the total mixture.

The ozonization is conveniently carried out by passing through the cyclopentenylammonium salt mixture a dry mixture of ozone and a diluent gas unaffected by the ozonization reaction, suitably air, oxygen, or an inert gas such as nitrogen. The concentration of ozone in the gaseous mixture is not critical, but the use of pure ozone or a high concentration of ozone may result in a waste of this material if the equipment or rate of flow does not permit adequate contact between the ozone and the cyclopentenylammonium salt. I ordinarily prefer to employ a stream of oxygen containing between about 2 and about 15% by weight of ozone. Lower concentrations of ozone are undesirable, because such concentrations unduly extend the reaction time.

The ozonization is most conveniently carried out at ordinary temperature, i.e., around 15 to 40° C. Higher temperatures may be employed, but tend to cause degradation of the cyclopentenylamine. Considerably lower temperature may also be employed, as low as about —75° C., but are not ordinarily justifiable on an economic basis.

The rate of addition of ozone to the reaction mixture is not critical, and can be carried out at any convenient and reasonable rate under the existing conditions. At more rapid rates, the losses of ozone from the system because of incomplete reaction tend to increase, while at slow rates the time required for complete ozonization is extended. In any event, the passage of ozone through the reaction mixture is continued until ozone appears in substantial proportions of the exit gases, thus indicating that the cyclopentenylammonium salt has been substantially completely reacted. The introduction of ozone is then discontinued.

The product of the ozone treatment is presumably an "ozonide" and will be referred to herein as such. I have not isolated or characterized this material, however, and I am not certain as to its identity or structure. Whatever its nature, it is readily converted into pyrrolidonecarboxylic acid and glutamic acid by the procedure described hereinafter.

The ozonization product mixture is subjected to oxidation to cleave and to selectively oxidize the ozonide, employing a selective oxidizing agent to effect non-destructive oxidation, at elevated temperatures up to the reflux point, suitably from about 50 to about 150° C. In a preferred technique, the ozonization product is added to glacial acetic acid, then treated with air or oxygen until the solution becomes free from active oxygen (i.e., fails to liberate iodine from potassium iodide). For this purpose, a mixture of oxygen with a catalytic amount of ozone (around 0.01 to 0.1%) is especially desirable. In another technique, the ozonization product is acidified (unless already acidic) with sulfuric acid, hydrochloric acid, formic acid, acetic acid, or the like, then admixed with hydrogen peroxide, and heated at about 75 to about 100° C. for about ½ to about 5 hours. The concentration of hydrogen peroxide should preferably be at least about 30% by weight, optimally about 50%, and the proportion of hydrogen peroxide to ozonide should be at least equimolar. Other oxidizing agents can also be employed, such as cupric oxide, hypochlorous acid, sodium hypochlorite, potassium permanganate, oxides of nitrogen, and the like.

The oxidized ozonization product comprises a mixture of DL-glutamic acid and DL-pyrrolidonecarboxylic acid, which can be separately recovered if desired by means well known in the art. In one technique, any volatile organic acids, such as formic acid or acetic acid, are removed by fractional distillation, azeotropic distillation, or by other suitable means. Inorganic acids, such as sulfuric acid, are neutralized and/or removed, e.g., by precipitation with barium hydroxide or other suitable base. Any solids resulting therefrom are filtered off. The filtrate is adjusted to pH 3.2, the DL-glutamic acid is allowed to crystallize, and the crystals are filtered off. The filtrate is extracted with an ester such as ethyl acetate, which selectively removes the pyrrolidonecarboxylic acid. Other techniques for the separation may be employed, as disclosed in the art.

The crude oxidation product can also be treated to convert the DL-pyrrolidonecarboxylic acid therein into DL-glutamic acid by hydrolysis under acid or basic conditions well known to the art. After hydrolysis, the DL-glutamic acid can be recovered from the hydrolyzate by crystallization at its iso-electric point.

The salts employed in my invention are the reaction products of cyclopentenylamine and a strong acid, i.e., an acid having an ionization constant of at least about $10^{-1}$ at 25° C., preferably a strong mineral acid.

The following operating examples will more clearly illustrate my invention.

Example 1

*Preparation of cyclopentenylamine.*—To a 250-ml. autoclave, which had been cooled in crushed Dry Ice, were successively added 100 ml. of liquid ammonia and a solution (cooled to —50° C.) of 15.2 g. of 3-chlorocyclopentene in 15 g. of toluene, anhydrous conditions being maintained as nearly as possible. The autoclave was sealed and allowed to come to ambient temperature (about 29° C.) and ambient pressure (118 p.s.i.g.), where it was allowed to remain for about 30 minutes. The unreacted ammonia was then vented, and the autoclave was unloaded and washed with three 10-ml. portions of toluene. The product and washings were combined and filtered to remove the solid-phase ammonium chloride. Two additional batches were prepared according to the same procedure, and the filtrates were combined and heated on a steam bath under a reflux condenser for ½ hour to drive off the remaining ammonia. The deammoniated solution was cooled in an ice bath, and hydrogen chloride gas was bubbled into it until 8 grams had been absorbed, at which point an excess of hydrogen chloride appeared to be present. The resulting precipitate was filtered off and washed with ether. The crude product, weighing 26 g. (50% yield), had an odor of free amine, and was accordingly purified by the following procedure. The entire crude product (except 1 gram which was removed for solubility tests) was dissolved in 40 ml. of ethanol with heating. The solution was decolorized with activated carbon and filtered hot, and the carbon cake was washed with 10 ml. of ethanol. The filtrate and washings were diluted with 150 ml. (3 vol.) of ethyl ether, and cyclopentenylammonium chloride was allowed to crystallize therefrom in white needles. The crystals were filtered off, washed with ethyl ether, and air dried. The purified product weighed 14.5 grams and analyzed as follows:

|    | Theory, percent | Found, percent |
|----|-----------------|----------------|
| Cl | 29.6            | 29.84          |
| N  | 11.7            | 11.57          |

*Ozonization of cyclopentenylammonium chloride.*—Cyclopentenylammonium chloride (1.2 g., 0.01 mole) was dissolved in 15 ml. of glacial acetic acid, and through the solution was bubbled a stream of oxygen containing about 4% ozone at the rate of about 30 liters per hour and at a temperature around 25° C. The ozonization was complete at the end of 20 minutes. The treated solution was added to a solution of 0.1 ml. of sulfuric acid in 20 ml. of glacial acetic acid. To the resulting solution was added a mixture of 15 ml. of glacial acetic acid and 0.6 ml. of aqueous 50% hydrogen peroxide. The total mixture was heated to 90° C. over a period of 45 minutes, during which time it began to darken. After an additional 15 minutes at 90° C. a potassium iodide test for active oxygen was negative. The solution was then cooled, 1 ml. of 28% ammonium hydroxide was added, and the mixture was evaporated to dryness. The dry residue was dissolved in water, made up to a total volume of 50 ml., and analyzed for L-glutamic acid by the decarboxylase method (Seidman & Blish, J. Ag. & Food Chem. 5 (1957), 448). An aliquot was subjected to acid hydrolysis under conventional conditions and the hydrolyzate was analyzed for L-glutamic acid. The first analysis is a measure of the L-glutamic acid in the product, while the difference between the first and second analyses represents the pyrrolidonecarboxylic acid produced by the process. Before hydrolysis the solution contained 0.8 mg./ml. of L-glutamic acid, equivalent to 0.08 g. of DL-glutamic acid, or a yield of 5.4% based on cyclopentenylamine. After hydrolysis, the product solution contained 4.2 mg./ml., equivalent to 0.42 g. of DL-glutamic acid, or a yield of 28.6%.

Example 2

The ozonization and subsequent procedure of Example 1 were repeated except that the oxidation was carried out with 1.8 ml. of aqueous 50% hydrogen peroxide at a temperature below 85° C. The oxidized solution was amber in color, and was found to contain 2.4 mg./ml. of L-glutamic acid, equivalent to 0.24 g. of DL-glutamic acid, or a 16.3% yield based on cyclopentenylamine. After hydrolysis, the product solution contained 5.1 mg./ml. of L-glutamic acid, equivalent to 0.51 g. of DL-glutamic acid, or a yield of 34.7%.

Example 3

*Ozonization of cyclopentenylammonium sulfate.*—Into 10 ml. of glacial acetic acid in a 30-ml. beaker were weighed 0.5216 g. of approximately 96% sulfuric acid, then 0.8581 g. of cyclopentenylamine. The resulting solution was washed into an ozonization vessel with an additional 5-ml. portion of glacial acetic acid. The solution was ozonized at 23° C. with about 4% ozone in oxygen at a flow rate of about 30 liters per hour, 20 minutes being required to complete the ozonization. The treated solution was added to a mixture of 0.1 ml. of sulfuric acid and 20 ml. of glacial acetic acid, then a mixture of 0.8 ml. of 50% hydrogen peroxide in 15 ml. of glacial acetic acid was added, and the total mixture was heated slowly to 90° C. over a period of about one hour. During the heating, a suspended immiscible phase cleared up at 65° C. After about 10 minutes at 90° C., a potassium iodide test for active oxygen was negative. The solution was then cooled, commingled with 2 ml. of 28% ammonium hydroxide solution, and evaporated to dryness. The residue was dissolved in water, made up to 50 ml. and analyzed as in Example 1. Before hydrolysis, the solution contained 0.88 mg./ml. of L-glutamic acid, equivalent to 0.088 g. of DL-glutamic acid, or a yield of 5.8%, based on cyclopentenylamine. After hydrolysis, the product contained 1.0 mg./ml., equivalent to 0.10 g. of DL-glutamic acid, or a yield of 6.3%.

*Example 4*

Ozonization of cyclopentenylammonium phosphate.— To a solution of 1.65 g. (0.02 mole) of cyclopentenylamine in 20 ml. of ethyl ether were added 2.3 g. of 85% orthophosphoric acid dropwise with stirring and with sufficient cooling to keep the ether from volatilizing. The resulting crystals of cyclopentenylammonium phosphate were filtered off, dried, and found to weigh 3.7 g. (theo. 3.62 g.). The crystals were dissolved in 25 ml. of glacial acetic acid, and the solution was treated at 25° C. with 4% ozone in oxygen at a flow rate of about 30 liters per hour, 35 minutes being required to complete the ozonization. The treated solution was commingled with 0.3 ml. of sulfuric acid in 28 ml. of glacial acetic acid, then a mixture of 1.6 ml. of 50% hydrogen peroxide in 15 ml. of glacial acetic acid was added, and the total mixture was heated at 90° C. for 3.5 hours. At the end of this time a potassium iodide test for active oxygen was negative. The solution was then cooled, commingled with 2 ml. of 28% ammonium hydroxide solution, and evaporated to dryness. The residue was hydrolyzed by refluxing in 40 ml. of aqueous 20% hydrochloric acid for 4 hours. The hydrolyzate was evaporated to small volume to remove the hydrogen chloride. The residue was dissolved in water, made up to 100 ml., and analyzed as in Example 1. The solution was found to contain 0.88 mg./ml. of L-glutamic acid, corresponding to 0.166 g. of DL-glutamic acid, or a yield of 5.6%.

*Example 5*

Oxygen cleavage of ozonide.—A solution of 4.8 g. (0.04 mole) of cyclopentenylammonium chloride in 40 ml. of glacial acetic acid was ozonized at 25° C. with 4% ozone in oxygen at a flow rate of about 30 liters per hour, about 1.3 hours being required to complete the ozonization. The treated solution was further oxidized by passing a stream of oxygen containing about 0.05% ozone through said solution while slowly raising the temperature to 60° C., 30 minutes being required to reach this temperature. During this time, the solution darkened and the potassium iodide test for active oxygen became negative. The acetic acid was distilled off and the residue was hydrolyzed by refluxing with 80 ml. of aqueous 20% hydrochloric acid for 4 hours. The hydrolyzate was evaporated to low volume to remove the hydrochloric acid, and the residue was dissolved in water, made up to 100 ml., and analyzed as in Example 1. The solution was found to contain 4.59 mg./ml. of L-glutamic acid, corresponding to 0.918 g. of DL-glutamic acid, or a yield of 15.6%.

While the foregoing examples illustrate certain specific embodiments of the invention, together with specific starting materials, processing materials, and operating steps and conditions, it is to be understood that such matters are illustrative only, and are not in any way intended as a limitation upon the scope of the invention. Numerous modifications and equivalents will be apparent from the foregoing description to those skilled in the art.

In accordance with the foregoing description, I claim as my invention:

1. A process for preparing pyrrolidonecarboxylic acid which comprises subjecting a solution of a strong acid salt of $\Delta^2$-cyclopentenylamine to contact with an ozone-containing gas until the absorption of ozone by said solution substantially ceases, cleaving the resulting ozonization product under oxidizing conditions, and recovering pyrrolidonecarboxylic acid therefrom.

2. A process for preparing glutamic acid which comprises subjecting a solution of a strong acid salt of $\Delta^2$-cyclopentenylamine to contact with an ozone-containing gas until the absorption of ozone by said solution substantially ceases, cleaving the resulting ozonization product under oxidizing conditions, whereby a mixture of glutamic acid and pyrrolidonecarboxylic acid is obtained, subjecting said mixture to hydrolysis, and recovering DL-glutamic acid from the hydrolyzate.

3. A process which comprises treating a solution of a strong acid salt of $\Delta^2$-cyclopentenylamine in an organic solvent with an ozone-containing gas until the absorption of ozone substantially completely ceases, cleaving the resulting ozonization product with an oxidizing agent at a temperature between about 50 and about 150° C., hydrolyzing the oxidized ozonization product, and recovering DL-glutamic acid therefrom.

4. The process of claim 3 wherein said salt is $\Delta^2$-cyclopentenylammonium chloride.

5. The process of claim 3 wherein said salt is $\Delta^2$-cyclopentenylammonium sulfate.

6. The process of claim 3 wherein said salt is $\Delta^2$-cyclopentenylammonium phosphate.

7. A process which comprises treating a solution of a mineral acid salt of $\Delta^2$-cyclopentenylamine in an inert solvent therefor with an ozone-containing gas at a temperature between about 15 and about 40° C. until the absorption of ozone substantially ceases, decomposing the resulting ozonide with air containing a catalytic proportion of ozone at a temperature between about 50 and about 150° C., hydrolyzing the treated product, and recovering DL-glutamic acid therefrom.

8. The process of claim 7 in which said solvent is acetic acid.

9. A process which comprises treating a solution of a mineral acid salt of $\Delta^2$-cyclopentenylamine in an inert solvent therefor with an ozone-containing gas at a temperature between about 15 and about 40° C. until the absorption of ozone substantially ceases, decomposing the resulting ozonide by heating with hydrogen peroxide, hydrolyzing the treated product and recovering DL-glutamic acid therefrom.

References Cited in the file of this patent

UNITED STATES PATENTS

| | | |
|---|---|---|
| 2,791,606 | Novak et al. | May 7, 1957 |
| 2,801,250 | Sullivan | July 30, 1957 |
| 2,833,786 | Purvis | May 6, 1958 |